United States Patent [19]

Kovacs et al.

[11] 3,831,433

[45] Aug. 27, 1974

[54] APPARATUS FOR MEASURING THE DENSITY OF A FLUID BY RESONANCE

[75] Inventors: Sandor Kovacs; Gyorgy Felsovalyi, both of Budapest, Hungary

[73] Assignee: Merestechnikai Kozponti Kutato Laboratorium, Budapest, Hungary

[22] Filed: Nov. 28, 1972

[21] Appl. No.: 309,989

[30] Foreign Application Priority Data
Dec. 7, 1971  Hungary............................ ME 1448

[52] U.S. Cl............................... 73/32 A, 73/194 M
[51] Int. Cl. ............................................. G01n 9/00
[58] Field of Search............ 73/32, 32 A, 194 B, 30, 73/67, 67.1, 67.2, 32 R

[56] References Cited
UNITED STATES PATENTS

| 3,251,226 | 5/1966 | Cushing......................... | 73/194 B X |
| 3,431,770 | 3/1969 | Sanford et al...................... | 73/23 |
| 3,618,360 | 11/1971 | Curtis.................................. | 73/32 |

Primary Examiner—Richard C. Queisser
Assistant Examiner—Stephen A. Kreitman
Attorney, Agent, or Firm—Young & Thompson

[57] ABSTRACT

Apparatus for measuring the density of a fluid, and if desired also its mass flow rate, comprises a sensor unit having in unitary assembly a pair of coaxial resonant cylinders each anchored at one end and extending toward each other at their free ends. One resonant cylinder is in a closed chamber and the other provides a passageway for the flow therethrough of the fluid to be measured. The sensor has means to excite vibrations in the resonant cylinders and means for sensing vibrations in the resonant cylinders. The exciting means and the sensing means of each resonant cylinder are in a feedback loop with an amplifier, and means are provided to compare the outputs of the amplifiers and to derive a signal indicative of the density of the tested fluid. In addition, the flow rate of the fluid is metered and a multiplier responsive to the density and flow rate signals derives a signal indicative of mass flow.

20 Claims, 8 Drawing Figures

APPARATUS FOR MEASURING THE DENSITY OF A FLUID BY RESONANCE

The present invention relates to apparatus for the measurement of the density of a fluid (which is used herein to include both liquids and gases) and is particularly, although not exclusively, concerned with apparatus for continuous measurement of a flowing fluid in which not only the density is measured but, if desired, the mass flow also.

The invention relates to a sensor unit and to apparatus incorporating the same for use in measuring the density of a fluid and to apparatus for use in measuring the mass flow of a fluid.

In measuring the density of liquids and gases in industrial processes, it has previously been proposed to employ vibratory transducers supplying frequency output signals such as described in French Pat. No. 1,287,559. With the previously proposed apparatus, it is the vibration frequency or period of vibrating reeds which is measured. The output signal of the transducer is a single frequency which can be converted into density readings.

It has also been proposed to use externally excited density meters of the vibration type which do not contact the medium to be measured. The sensing unit of such a measuring instrument is a single vibrating cylinder the natural frequency or resonance frequency of which varies in dependence on the density of the medium in question.

Both of the above previous proposals require crystal-controlled counters or other expensive electronic devices in order to convert the output signal into density readings. Their vibrating members have to be made of special constructional materials such as those known as "Ni SPAN C," the coefficient of the thermal expansion of which is zero. The Curie point, however, of such materials is fairly low, for example, 200°C.; and therefore, vibrating members made of them may be used at temperatures of at most 100° C., which considerably restricts their industrial application. For example, such members cannot be used in petroleum distillation which is carried out at temperatures of about 300° C.

The present invention provides an apparatus which substantially mitigates the above disadvantages and which does not require the use of costly signal processing electronic equipment and does not require special materials for the sensors.

According to a first aspect of the present invention, there is provided a sensor unit for use in measuring the density of a fluid, comprising a first resonant structure supported in a closed chamber to vibrate at a characteristic frequency, and a second resonant structure supported to vibrate at a characteristic frequency and having a passageway therethrough for the fluid whose density is to be measured. Preferably these first and second resonant structures have each associated therewith means to excite vibrations in the resonant structures and means for sensing vibrations in the resonant structures.

According to a second aspect of the invention, there is provided apparatus for use in measuring the density of a fluid, comprising the above-defined preferred sensor unit, in combination with first and second amplifiers, the first amplifier having its input and output respectively coupled to the vibration sensing means and to exciting means associated with the first resonant structure in a feedback loop for maintaining vibration of the first resonant structure, and the second amplifier having its input and output respectively coupled to the vibration sensing and exciting means associated with the first resonant structure in a feedback loop for maintaining vibration of the second resonant structure.

In use, the characteristic vibration frequency of the first resonant structure in the closed chamber is used as a reference. The second resonant structure is exposed to the fluid medium to be measured and its characteristic vibration frequency varies with variations in the density of the fluid medium. Preferably, therefore, the apparatus further comprises means coupled to the outputs of the first and second amplifiers to compare the characteristic vibration frequencies of the first and second resonant structures and to derive therefrom a signal indicative of the density of a fluid medium to which the second resonant structure is exposed. This frequency comparison may be done in various ways. One preferred way is to apply the two characteristic frequencies to a mixer circuit and to extract the difference frequency.

In a third aspect of the present invention, there is provided apparatus for use in measuring the mass flow of a fluid medium, comprising the above apparatus by which is derived a difference frequency signal indicative of the density of the fluid, means responsive to the rate of flow of the fluid (e.g., a turbine flow meter) to derive a signal representing the rate of flow, and a multiplier responsive to the difference frequency signal and the rate of flow signal to derive a signal indicative of the mass flow of the fluid. In this case the passageway through the second resonant structure is traversed by at least a portion of the flowing fluid. To this end, the second resonant structure may be a hollow cylinder supported at one end. The first resonant structure may be likewise a hollow cylinder supported at one end.

A convenient measurement of density can be made if the aforementioned difference frequency is made zero (i.e., the characteristic vibration frequencies are equal) for a zero density medium (i.e., a vacuum) to which the second resonant structure is exposed. An adjustment of the characteristic vibration of the first resonant structure can be made by adjusting the pressure in the closed chamber in which it is disposed.

These and other objects, features and advantages of the present invention will become apparent from a consideration of the following description, taken in connection with the accompanying drawings, in which.

Like reference characters designate like parts throughout the drawings.

Figure 1:
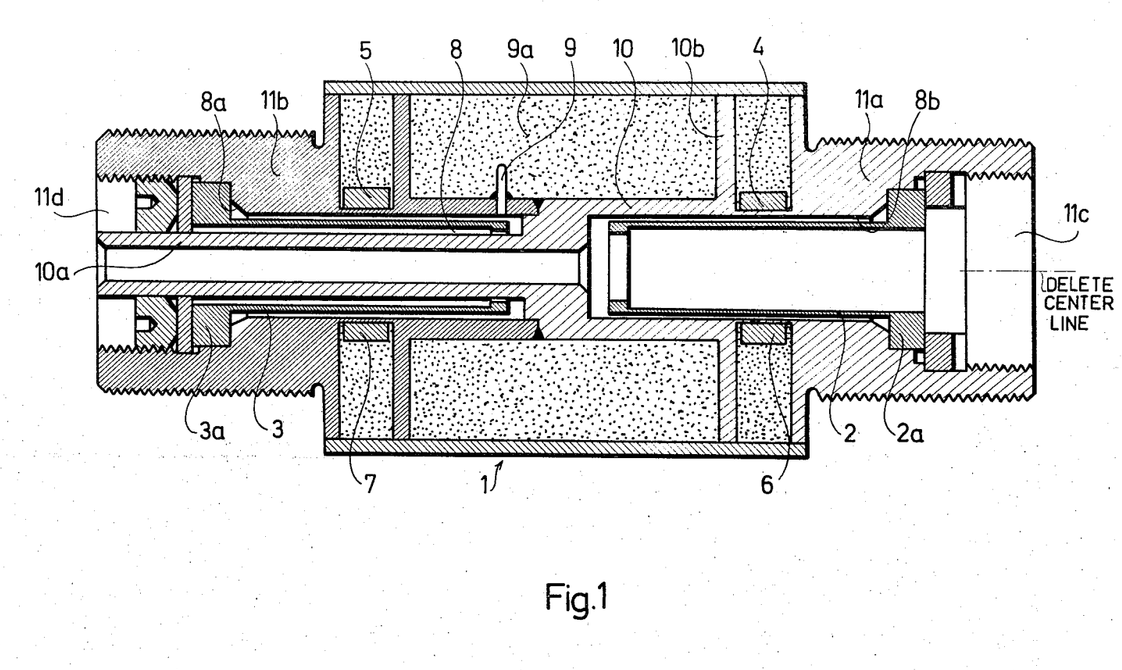
FIG. 1 is a longitudinal sectional view of a sensor unit according to the invention. This same sensor unit is employed in the embodiments of apparatus illustrated in the remaining figures.

Referring now to the drawings in greater detail, and first to FIG. 1, there is shown a sensor unit which is used in the various apparatus arrangements illustrated in FIGS. 2 to 8. In FIG. 1, a measuring vibration cylinder 2 has an enlarged end 2a seated in a housing 11a at one end of the unit. A reference vibration cylinder 3 similar to cylinder 2 has an enlarged end 3a seated in a housing 11b at the other end of the unit, the two cylinders being coaxially disposed. The outer end of the cylinder 2 communicates with an opening 11c in the housing 11a and the inner end communicates with a tubular portion 10a of a partition member 10. The portion 10a extends coaxially through, but spaced from, cylinder 3 and terminates at an opening 11d in the housing 11b where it is supported. Thus the tubular portion 10a and the cylinder 2 define an axial passageway for the flow of a fluid whose density and perhaps also mass flow is to be measured.

The partition member 10 serves to isolate the reference cylinder 3 from contact with the medium to be measured and defines with adjacent portions of the housing a closed chamber 8a in which the vibration cylinder 3 is non-contactingly (apart from its supported end 3a) positioned and which is filled by an inert medium at a desired pressure introduced through a short pipe which provides a controllable inlet communicating with a fluid-containing chamber 9a defined within the housing of the sensor unit. The natural frequency of cylinder 3 may be controlled by changing the pressure prevailing in chamber 8a. It will be seen that the measuring cylinder 2 is likewise noncontactingly positioned (apart from its supported end 2a) in a second chamber 8b defined by the partition member 10 and adjacent parts of housing 11a. By putting the chamber 8b under vacuum, and adjusting the pressure prevailing in chamber 8a, the natural resonant frequencies of both cylinders 2 and 3 may be rendered equal. Then, pipe 9 will be closed by means (not shown) whereby a zero medium density (i.e. vacuum) is identified with a zero frequency difference between the natural frequencies of the cylinders 2 and 3, the latter now providing a reference frequency for subsequent measurements.

The cylinders 2 and 3 are arranged to have a good thermal coupling within the sensor unit so that they adopt substantially the same temperature thereby providing a compensation of frequency changes with temperature acting to make the difference frequency independent of temperature.

Both cylinders 2 and 3 may be excited either electromagnetically, magnetostrictively or capacitively. Excitation is obtained by exciter heads 4 and 5 respectively which, as is described more fully below, are arranged to cause both cylinders 2 and 3 to vibrate at their natural frequencies and with the highest possible amplitude.

Displacements of the cylinder walls due to vibration are sensed by sensors 6 and 7 respectively which supply corresponding electric signals. The frequency of such signals is proportional to the speed of the displacements.

In operation of the sensor unit, the medium to be measured traverses the axial passageway including the measuring cylinder 2 and the mass of the flowing medium therein will be added to the mass of this cylinder whereby the natural frequency of the cylinder will change as a function of the density of the flowing medium. The density is proportional to the second power of the frequency difference between the natural frequencies of vibration cylinders 2 and 3.

The partition member 10 has an annular part 10b in which is housed electronic units, the electronic component parts and electric terminals of which have no contact with the medium under measurement. Such units, which comprise part of the apparatus 30 of FIG. 2, consist at least of amplifiers 12a and 12b which are shown in the block diagram of FIG. 2 and which form with the exciter heads 4 and 5 and the receiver heads 6 and 7 respectively a pair of electromechanical feedback loops by which vibration of cylinders 2 and 3 is continuously maintained at characteristic frequencies determined by the natural frequencies of the cylinders.

Figure 2:
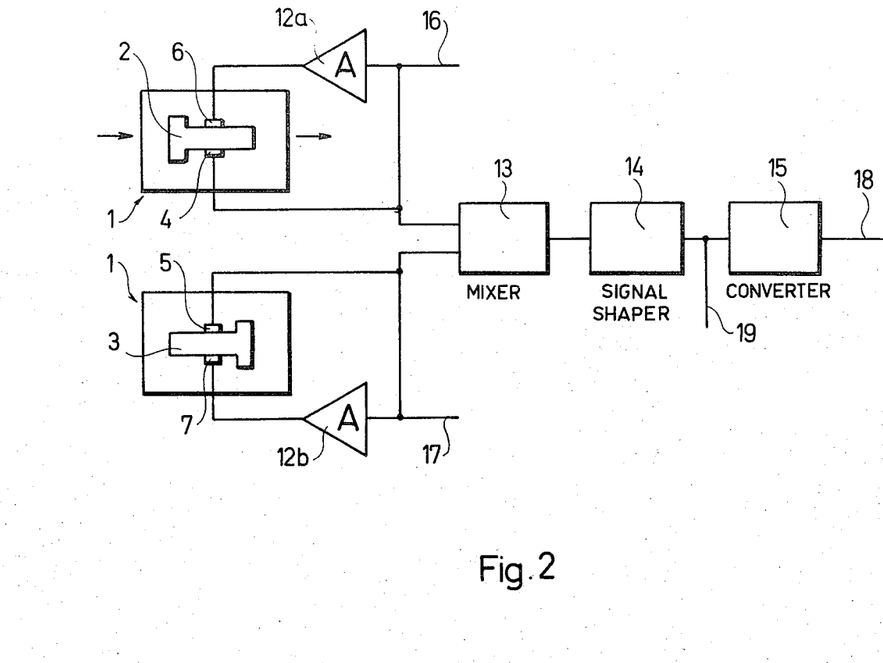
FIG. 2 is a block diagram of one embodiment of the apparatus according to the invention for measuring density.

Referring more particularly to FIG. 2, the exciter heads 4 and 5 are connected to output terminals 16 and 17 of the amplifiers 6 and 7 respectively. The output signals of the amplifiers 12a and 12b associated with cylinder 2 and cylinder 3 respectively are applied to a conventional mixer circuit 13 and the difference frequency signal extracted and shaped in a conventional signal shaper circuit 14. This may, for example, produce constant amplitude signals of rectangular or other waveform. The shaped signal at the difference frequency appears at an output 19. In the embodiment shown, shaper circuit 14 has a frequency-to-current converter 15 connected to it at the output 18 of which are obtained current changes proportional to changes in density of the medium under measurement.

Figure 3:
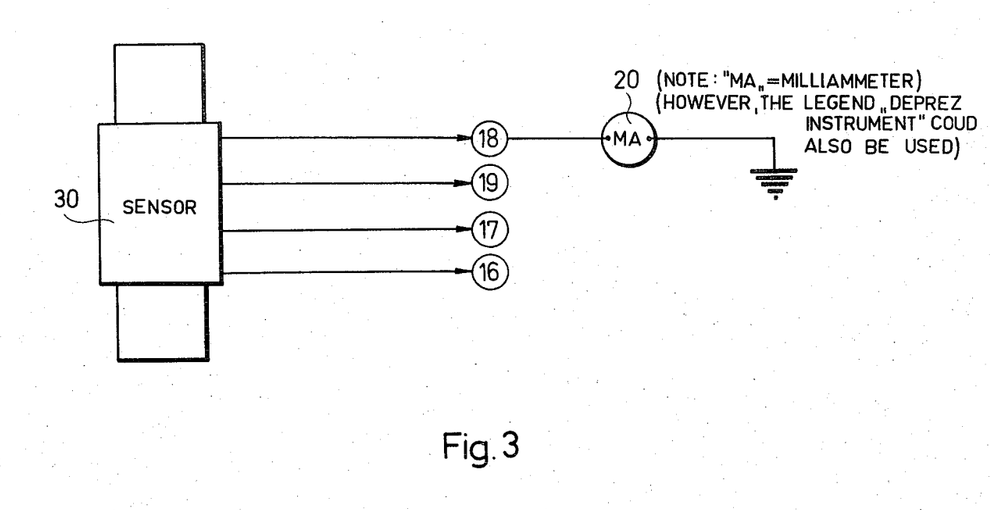
FIGS. 3, 4 and 7 show block diagrams of other embodiments of density-measuring apparatus according to the invention and based on the apparatus of FIG. 2.

FIG. 3 shows how the analog output signal obtained at output 18 of the apparatus 30 of FIG. 2 is displayed on a currentindicating meter 20, such as a Deprez meter, which may be calibrated directly in density units.

Figure 4:
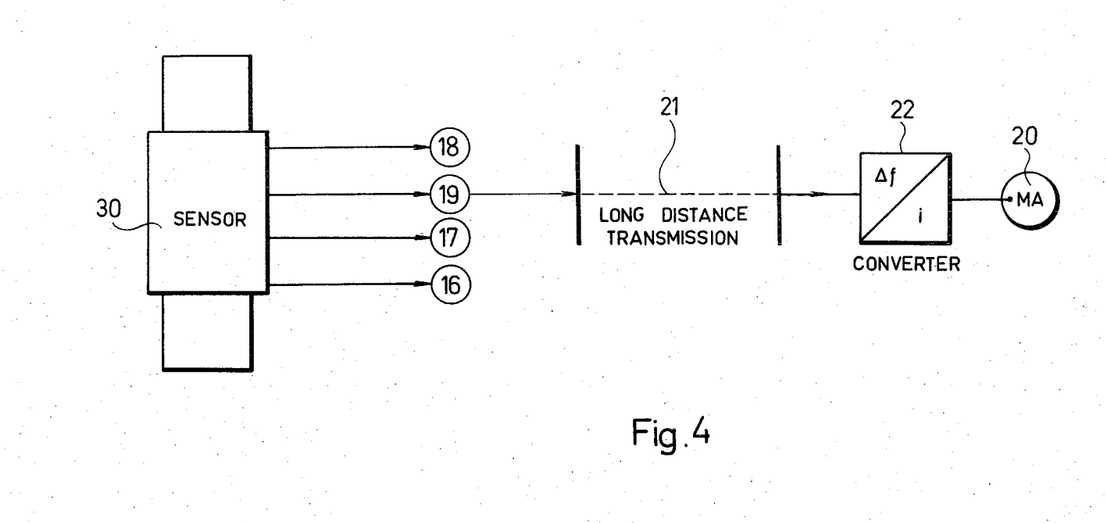

It is possible to transmit the difference frequency signal 19 of the apparatus over considerable distances without loss of information. A system in which this is done is shown in FIG. 4. Dashed line 21 represents a transmission link providing distant transmission by telephonic, telegraphic or any other means of the frequency signal. The transmission of information by a frequency signal prevents loss of accuracy. At the far end of the link 21, the signal is applied to a frequency-to-current converter 22 and the analog signal displayed on the Deprez instrument 20 at the location where the measuring results are to be processed.

The apparatus of the invention described thus far may be adapted to the measurement of mass flow by combining the information obtained relating to the density of a flowing medium with information relating to the rate of flow. Apparatus augmented to perform this function is shown in FIGS. 5 and 6 where as before the block 30 indicates the apparatus of FIG. 2 from which is obtained the density-representing difference frequency signal at terminal 19.

Figure 5:
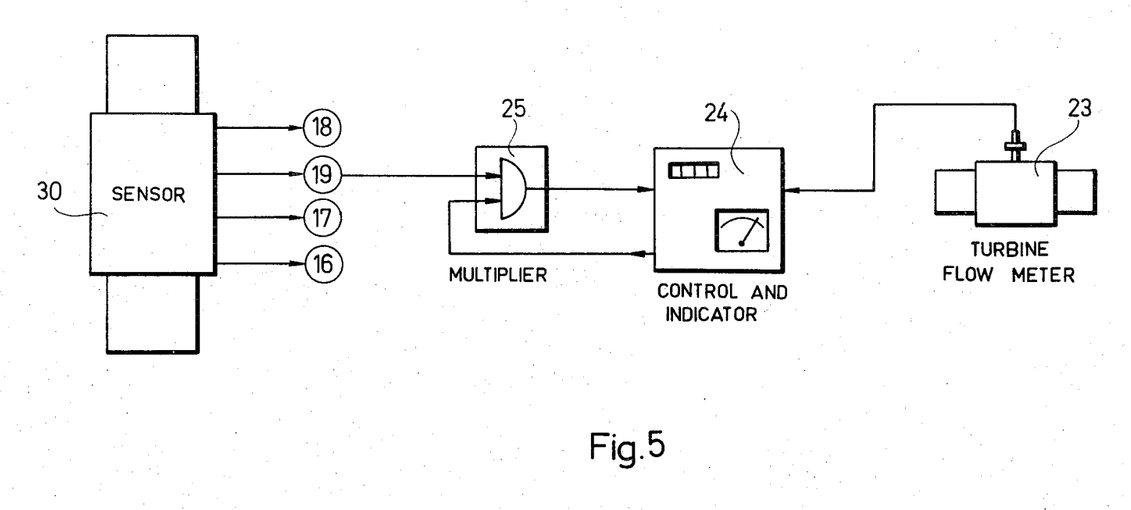
FIGS. 5, 6 and 8 show embodiments of the invention for measuring mass flow of a fluid and based on the apparatus of FIG. 2.
Figure 6:
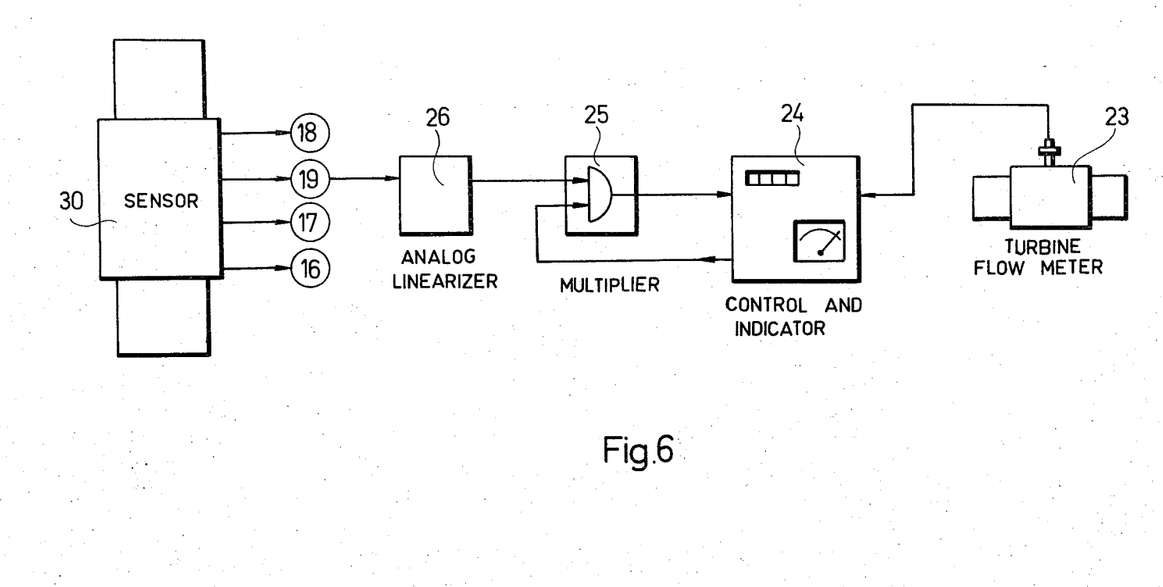
Figure 7:
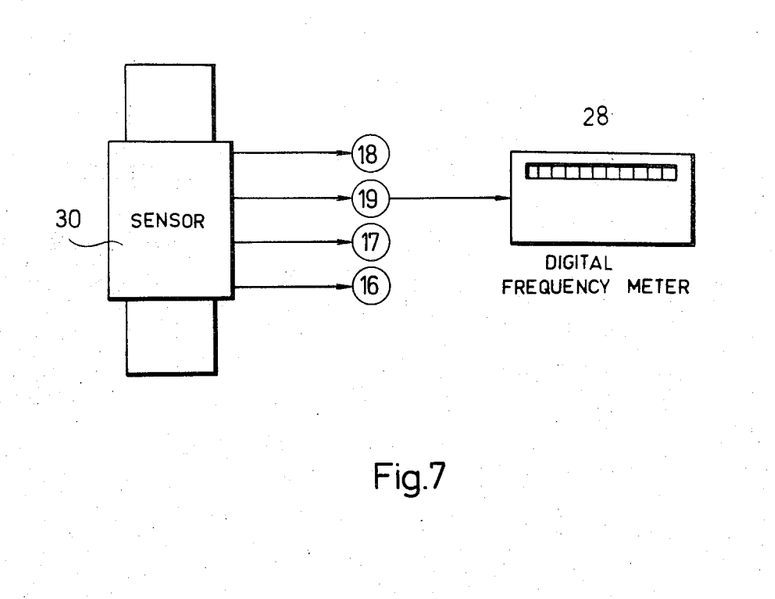

FIG. 5 shows the provision of a turbine flow meter 23 which supplies a flow rate signal to a multiplier 25 through an electronic control and indicator unit 24. The output signal from terminal 19 is also applied to the multiplier 25 and the electronic indicator unit 24 displays the output of the multiplier in terms of mass flow. FIG. 6 shows the addition of a simple analog linearizing circuit 26 provided between the output 19 and multiplier 25 so that linear mass flow measurement can be displayed throughout the whole measuring range of the apparatus.

Where very high accuracy is required in measuring the density of liquid or gaseous media, the high accuracy of the measuring sensor unit of FIG. 1 in the arrangement of FIG. 2 may be fully utilized, while the error caused by the frequency-to-current conversion is eliminated, by the apparatus shown in FIG. 7. The difference frequency signal appearing on the output 19 is transmitted directly to a digital frequency meter 28. The measuring sensor can, upon calibration, be adjusted so that the digital frequency meter 28 indicates density values instead of frequency within optionally narrow limits lying within the whole measuring range and including the most frequently occurring practical values.

Figure 8:
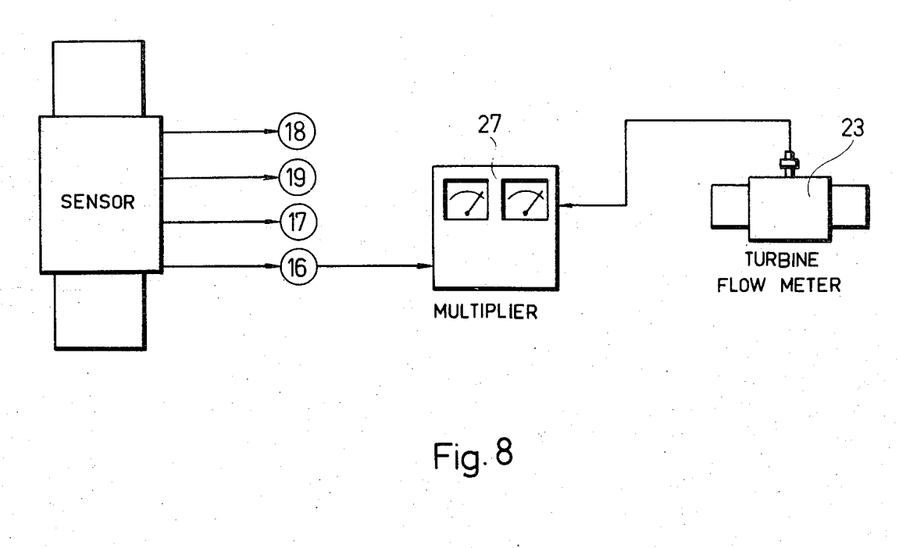

FIG. 8 shows an embodiment of the apparatus according to the invention in which mass flow is measured by using the direct frequency output of the amplifier 12a associated with measuring cylinder 2 and obtained at terminal 16 of the apparatus of FIG. 2 or by using known vibration type density meters supplying frequency output signals. The output signal at terminal 16 and the flow rate signal of the flow meter 23 are transmitted to an electronic unit 27 where they are combined to provide the desired mass flow indication.

In summary, it will be noted that the apparatus of FIG. 2 provides a frequency signal the frequency of which varies, after calibration, from zero upward and is characteristic of the density of the fluid medium under measurement. Vacuum, i.e., "zero density," has zero difference frequency associated with it. Intricate and expensive signal-processing electronic equipment is not necessary to process the output signals, although of course such electronic means can be used if circumstances require.

The density-indicative frequency may be directly converted to a form displayable on a Deprez instrument calibrated in density units. Transmission of the frequency signal over considerable distances is possible without loss of the information content.

In order to measure mass flow, the difference frequency output signal may be readily combined with that from a turbine flow meter and allows use of a simple and inexpensive electronic indicator unit.

Due to the sensor unit employing a pair of neighboring vibration cylinders having a close thermal coupling, the temperature effects on the resonant frequencies are substantially compensated and it is not necessary to use materials of low coefficient of thermal expansion for the cylinders, thus enabling the latter to be designed for higher operating temperatures than the low coefficient materials such as Ni SPAN C allow.

Thus it is possible to construct apparatus embodying this invention, which is suitable for measurements in processes such as petroleum distillation at 300° C., in which the previously known measuring sensors cannot be used due to the low Curie point (200° C.) of Ni SPAN C or like construction materials.

By employing the difference frequency signal, any digital frequency meter can be used directly for indicating density values without decreasing the accuracy of measurement so that intricate electronic units indispensable to the known systems can now be dispensed with.

Since the medium to be measured does not contact the reference vibration cylinder, the natural frequency of the latter is maintained constant at a highly stabilized value. If desired, the output signal 17 can be used as the reference standard (i.e., a clock signal) in the digital frequency meter on which the value of density is indicated, thereby avoiding the need for a crystal-controlled oscillator. Thus a still simpler indicator unit is obtained.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. These and other modifications and variations can be resorted to without departing from the purview and scope of the present invention as defined by the appended claims.

Having described our invention, we claim:

1. A sensor unit for measuring the density of a fluid, comprising a first resonant structure disposed in a closed chamber to vibrate at a characteristic frequency, a second resonant structure supported to vibrate at a characteristic frequency and having a passageway therethrough for fluid whose density is to be measured, and means fixedly securing said first and second resonant structures together in unitary assembly and in close thermal coupling thereby to adapt said unit for use at a relatively high temperature of about 300°C.

2. A sensor unit as claimed in claim 1, each of said resonant structures comprising a hollow cylinder.

3. A sensor unit as claimed in claim 2, said cylinders being coaxial.

4. A sensor unit as claimed in claim 2, each said cylinder being fixedly supported at one end and having its other end free.

5. A sensor unit as claimed in claim 4, said cylinders being coaxial and the free ends of said cylinders being disposed adjacent each other.

6. A sensor unit as claimed in claim 1, said resonant structures being hollow coaxial cylinders each supported at only one end, and a conduit extending coaxially through said first resonant structure and communicating with said passageway of said second resonant structure.

7. A sensor unit as claimed in claim 1, and means to adjust the pressure in said closed chamber.

8. A sensor unit as claimed in claim 1, and means to excite vibrations to said resonant structures and means for sensing vibrations in said resonant structures.

9. Apparatus for measuring the density of a fluid, comprising a sensor unit comprising a first resonant structure disposed in a closed chamber to vibrate at a characteristic frequency, a second resonant structure supported to vibrate at a characteristic frequency and having a passageway therethrough for fluid whose density is to be measured, means fixedly securing said first and second resonant structures together in unitary assembly and in close thermal coupling thereby to adapt said unit for use at a relatively high temperature of about 300°C., means to excite vibrations in said resonant structures, means for sensing vibrations in said resonant structures, and first and second amplifiers, said first amplifier having its input and output respectively coupled to the vibration sensing means and exciting means associated with said first resonant structure in a feedback loop for maintaining vibration of said first resonant structure, and said second amplifier having its input and output respectively coupled to the vibration sensing means and exciting means associated with said second resonant structure in a feedback loop for maintaining vibration of said second resonant structure.

10. Apparatus as claimed in claim 9, and means coupled to the outputs of said amplifiers to compare the characteristic frequencies of vibration of said first and second resonant structures and to derive therefrom a signal indicative of the density of a fluid in said passageway.

11. Apparatus as claimed in claim 10, said comparison means comprising a mixer circuit for deriving a difference frequency signal from said characteristic frequencies.

12. Apparatus as claimed in claim 11, and a frequency-to-current converter coupled to said mixer circuit and responsive to said difference frequency signal to derive a current which varies with said difference frequency.

13. Apparatus as claimed in claim 12, said frequency-to-current converter being coupled to said mixer circuit through a signal-shaping circuit.

14. Apparatus as claimed in claim 12, and a Deprez instrument responsive to the current output of said converter and calibrated in density values.

15. Apparatus as claimed in claim 11, and a digital frequency meter coupled to said mixer circuit to display said difference frequency.

16. Apparatus as claimed in claim 10, said comparison means comprising a digital frequency meter to display the characteristic frequency of the output of said second amplifier using the characteristic frequency of the output of said first amplifier as a reference.

17. Apparatus for measuring the density of a fluid, comprising a sensor unit comprising a first resonant structure disposed in a closed chamber to vibrate at a characteristic frequency, a second resonant structure supported to vibrate at a characteristic frequency and having a passageway therethrough for fluid whose density is to be measured, means fixedly securing said first and second resonant structures together in unitary assembly and in close thermal coupling thereby to adapt said unit for use at a relatively high temperature of about 300°C., means to excite vibrations in said resonant structures, means for sensing vibrations in said resonant structures, first and second amplifiers, said first amplifier having its input and output respectively coupled to the vibration sensing means and exciting means associated with said first resonant structure in a feedback loop for maintaining vibration of said first resonant structure, and said second amplifier having its input and output respectively coupled to the vibration sensing means and exciting means associated with said second resonant structure in a feedback loop for maintaining vibration of said second resonant structure, means coupled to the outputs of said amplifiers to compare the characteristic frequencies of vibration of said first and second resonant structures and to derive therefrom a signal indicative of the density of the fluid in said passageway, said comparison means comprising a mixer circuit for deriving a difference frequency signal from said characteristic frequencies, means responsive to the rate of flow of said fluid to derive a signal representing the rate of flow, and a multiplier responsive to said difference frequency signal and said rate of flow signal to derive a signal indicative of the mass flow of said fluid.

18. Apparatus as claimed in claim 17, and a linearizer electrically connected between said mixer circuit and said multiplier.

19. Apparatus as claimed in claim 17, said rate of flow signal-deriving means comprising a turbine flow meter.

20. Apparatus as claimed in claim 9, the characteristic frequencies of vibration of said first and second resonant structures being equal when said second resonant structure is in vacuum.

* * * * *